United States Patent
Büttner et al.

(10) Patent No.: US 11,651,006 B2
(45) Date of Patent: May 16, 2023

(54) METHOD OF VISUALIZING SCREEN CONTENT ON A DATA VISUALIZATION SYSTEM, AND DATA VISUALIZATION SYSTEM FOR VISUALIZING SCREEN CONTENT

(71) Applicant: Siemens Aktiengesellschaft, Munich (DE)

(72) Inventors: David Büttner, Munich (DE); Matous Sedlacek, Landshut (DE); Holger Strobel, Steinbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 82 days.

(21) Appl. No.: 17/066,701

(22) Filed: Oct. 9, 2020

(65) Prior Publication Data
US 2021/0109948 A1   Apr. 15, 2021

(30) Foreign Application Priority Data

Oct. 11, 2019  (EP) .................................... 19202696

(51) Int. Cl.
 *G06F 16/26* (2019.01)
 *G06F 11/30* (2006.01)
(52) U.S. Cl.
 CPC .......... *G06F 16/26* (2019.01); *G06F 11/3051* (2013.01)
(58) Field of Classification Search
 CPC ...... G06F 16/26; G06F 11/3051; G06F 9/451; G05B 2219/32128; G05B 2219/36137; G05B 19/0423; G05B 19/418
 See application file for complete search history.

(56) References Cited

U.S. PATENT DOCUMENTS

2009/0222752 A1* 9/2009 Wall ...................... G05B 15/02
                                                                700/87
2014/0380234 A1* 12/2014 Shim ................... G06F 3/04842
                                                                715/781

(Continued)

FOREIGN PATENT DOCUMENTS

EP          2840455 A1     2/2015

(Continued)

OTHER PUBLICATIONS

Grilo, Antonio M. et al.: "An Integrated WSAN and SCADA System for Monitoring a Critical Infrastructure," IEEE Transactions on Industrial Informatics, vol. 10, No. 3, pp. 1755-1764, XP011555951, ISSN: 1551-3203, DOI: 10.1109/TII.2014.2322818; 2014; 10 pages.

(Continued)

*Primary Examiner* — Andrey Belousov

(74) *Attorney, Agent, or Firm* — Schmeiser, Olsen & Watts LLP

(57) ABSTRACT

In order to visualize screen content on a data visualization system in the context of monitoring and controlling the functionality of at least one device, which is networked in an installation-related and operational manner to form a device network, in a technical installation, in which each visualization aspect from a set of visualization aspects which is available for the device can be linked to device-specific operating data of device operating data provided by the installation, which device-specific operating data are respectively tied to this visualization aspect.

10 Claims, 2 Drawing Sheets

(56) References Cited

U.S. PATENT DOCUMENTS

Figure 1:
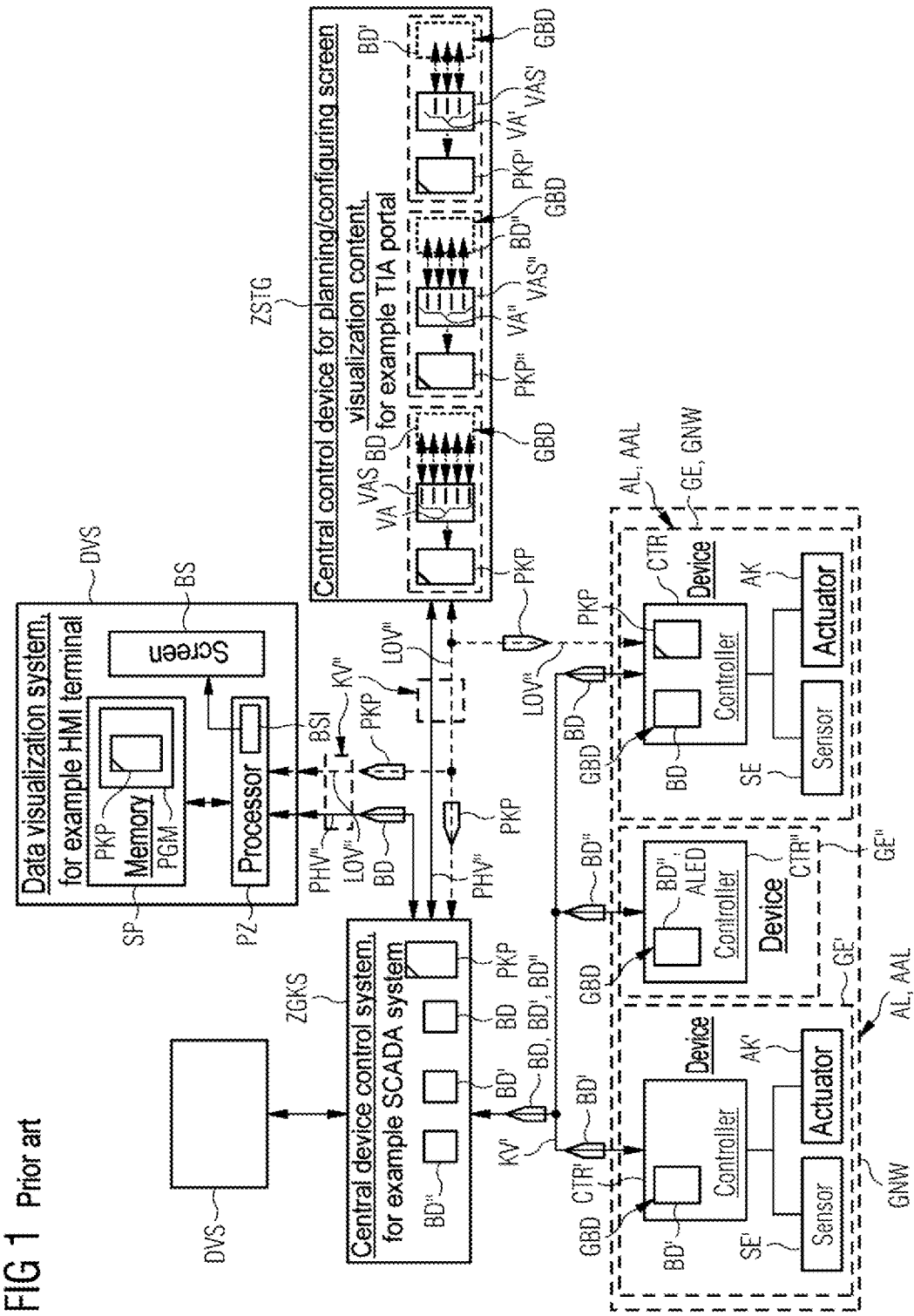

2015/0319046 A1* 11/2015 Plummer ............ H04L 12/2834
                                                    715/736
2017/0126841 A1*  5/2017 Bliss .................. G05B 19/0423
2019/0012142 A1*  1/2019 Bang ..................... G06F 3/0481

OTHER PUBLICATIONS

Extended European Search Report in corresponding European Patent Application No. 19202696.1 dated Aug. 18, 2020. 7 pages.

* cited by examiner

METHOD OF VISUALIZING SCREEN CONTENT ON A DATA VISUALIZATION SYSTEM, AND DATA VISUALIZATION SYSTEM FOR VISUALIZING SCREEN CONTENT

CROSS-REFERENCE TO RELATED APPLICATIONS

This application claims priority to European Patent Application No. 19202696.1, having a filing date of Oct. 11, 2019, the entire contents of which are hereby incorporated by reference.

FIELD OF TECHNOLOGY

The following relates to a method for visualizing screen content on a data visualization system and to a data visualization system for visualizing screen content.

BACKGROUND

Requirements with respect to the visualization of screen content may exist in different technical domains, in particular in industrial automation. Within the scope of the developments of the "Industrial Internet of Things (IIoT)", factory automation solutions in the near future will have to be able to support any number of networked devices, which will no longer be effectively possible with central engineering, as is described below on the basis of FIG. 1. Inter alia, the frequency of the changes in an automation installation which is provided for the production process will also drastically increase.

In order to visualize the screen content, use is made of data visualization systems which may be, for example, in the form of a Human Machine Interface (HMI) terminal and, in this form and configuration, are used not only in the context of factory automation but also quite generally in any technical field involving the use of technical installations in order to enable a monitoring or control functionality based on a technical process, in particular the production process already mentioned above, for example a current status, access to historical data, etc. The collected data records are typically represented with the aid of quickly comprehensible graphical objects such as graphs, lists, buttons, pointer instruments, etc. on operating and observation devices such as the HMI terminals.

In the environment of factory automation, the screen content of the HMI terminals must be manually created and must be linked to corresponding data sources. This is generally carried out using a central engineering tool which may be in the form of a "Totally Integrated Automation (TIA)" portal, for example. The creation must be carried out individually for each end customer, usually by a service expert with domain know-how. This is explained below in connection with the description of FIG. 1 which represents the prior art.

If changes then need to be made to the screen content of the HMI terminals, they require a restart of the complete automation software, that is to say the production in the factory comes partially or even completely to a standstill. In this case, the changes are undertaken in the system and are delivered to the corresponding HMI devices when the automation software is restarted. Even in the case of a very large number of devices and frequent changes, recourse must always be respectively had to the central engineering tool.

This is a general approach which can be carried out or is carried out in a similar manner in the industrial automation environment in the case of the product from KEBA GmbH Automation or Beckhoff Automation GmbH & Co. KG.

With the solution "KeTop", KEBA GmbH Automation thus uses the "KeStudio ViewEdit" tool to offer an engineering tool which can be used to design user interfaces for their HMI devices and to then make them available on Keba devices.

With the "TwinCAT 3" tool, Beckhoff Automation GmbH & Co. KG likewise offers a central engineering framework which must be used to plan/configure user interfaces for HMI devices and to make them available.

FIG. 1 shows central engineering for visualizing screen content on a data visualization system DVS, as is carried out in a known manner, in which the data visualization system DVS may be in the form of an HMI terminal, for example, as already mentioned above. The central engineering may also certainly comprise a plurality of data visualization systems DVS. According to FIG. 1, there are two data visualization systems DVS on which screen content can be visualized. By way of example, the screen content visualization is explained on the basis of one data visualization system DVS of the two data visualization systems DVS illustrated. Said data visualization system DVS has a non-volatile readable memory SP which stores processor-readable control program instructions of a program module PGM carrying out the screen content visualization, a processor PZ which is connected to the memory SP and executes the control program instructions of the program module PGM for visualizing the screen content, and a screen BS.

In order to visualize screen content BSI, the processor PZ accesses, on the one hand, the memory SP containing the program module PGM in order to generate the screen content BSI and, on the other hand, controls the screen BS, with the result that the generated screen content BSI can be visualized there. The manner in which the screen content BSI is generated in the processor PZ with the execution of the control program instructions of the program module PGM for visualizing the screen content is explained further below in connection with the description of FIG. 1.

The screen content to be planned/configured in the central engineering for visualizing the screen content comprises very generally data from devices of a technical installation AL which are networked in an installation-related and operational manner to form a device network GNW. Any type of technical installation can be fundamentally used as the technical installation AL with the devices and any device can be used as a data source. In the example illustrated, the installation AL is an automation installation AAL in the production process. With respect to the devices in the device network GNW, the installation AL, AAL can comprise either a first device GE or a plurality of, for example three, devices GE, a first device GE, a second device GE' and a third device GE", which, together with possibly further devices in addition to the three devices GE, GE', GE" illustrated, all provide device operating data GBD as data sources and are connected to one another in the device network GNW.

Of the devices GE, GE', GE" which are illustrated in FIG. 1 and form the device network(s) GNW, the first device GE has a first controller CTR which is connected to a first sensor SE and to a first actuator AK, wherein both the first sensor SE and the first actuator AK provide data which are stored in the first controller CTR as operating data BD for the first device GE, that is to say as device-specific operating data BD, of the device operating data GBD.

The second device GE' has a second controller CTR' which is connected to a second sensor SE' and to a second actuator AK', wherein both the second sensor SE' and the second actuator AK' here again also provide data which are stored in the second controller CTR' as further operating data BD' for the second device GE', that is to say as further device-specific operating data BD', of the device operating data GBD.

The situation with the third device GE" is slightly different. Although the third device GE" also again has a controller, specifically a third controller CTR", this controller, in contrast to the controllers CTR, CTR' of the other two devices GE, GE', is not connected to a sensor and actuator providing data. Nevertheless, the third device GE", as a data source, also provides device-specific operating data of the device operating data GBD. Additional operating data BD" for the third device GE", which are in the form of installation generation data ALED for the technical installation AL, AAL, are stored in the third controller CTR". The installation generation data ALED are data which are generated by virtue of the third device GE" receiving device operating data GBD from the other two devices GE, GE' in the device network GNW and the installation generation data ALED being generated from these transmitted device operating data GBD, for example by means of calculation.

The controllers CTR, CTR', CTR" are not least in the case of the automation installation AAL, in the form of programmable logic controllers (PLC).

The device-specific operating data BD, BD', BD" stored in the devices GE, GE', GE" are now centrally managed. For this purpose, the devices GE, GE', GE" in the device network GNW are connected to a central device control system ZGKS via a communication connection KV' which, for example in the case of the automation installation AAL, may be a PROFIBUS or PROFINET. The device-specific operating data BD, BD', BD" arrive at the central device control system ZGKS via this communication connection KV' according to either the PULL mechanism or the PUSH mechanism. In this case, the central device control system ZGKS is in the form of a "Supervisory Control and Data Acquisition (SCADA)" system.

In addition to the central device control system ZGKS having the devices GE, GE', GE" in the device network GNW, on the one hand, and the data visualization system(s) DVS, on the other hand, a central control device ZSTG for planning/configuring screen visualization content is also present for carrying out the central engineering for visualizing the screen content in a known manner. This control device ZSTG which is in the form of the central engineering tool already mentioned at the outset is now the TIA portal which runs on a "field PG/PC" component.

For the planning/configuration of the screen visualization content, which is carried out centrally in the central control device ZSTG, during off-line operation of the installation AL, AAL, for example by a service installation engineer or by the user of the installation, by consulting an operating and/or service manual for each device GE, GE', GE" in the device network GNW manually in situ, it is possible, from sets of visualization aspects available for the devices GE, GE', GE"—a first set of visualization aspects VAS having, for example, five (as illustrated by a check list in FIG. 1) visualization aspects for the first device GE, a second set of visualization aspects VAS' having, for example, three (as illustrated by a check list in FIG. 1) visualization aspects for the second device GE' and a third set of visualization aspects VAS" having, for example, four (as illustrated by a check list in FIG. 1) visualization aspects for the third device GE"—for each visualization aspect to be linked in the central control device ZSTG to device-specific operating data BD, BD', BD", respectively tied to this visualization aspect, of the device operating data GBD.

Five first visualization aspects VA in the first set of visualization aspects VAS can thus be manually linked to the first operating data BD, three second visualization aspects VA' in the second set of visualization aspects VAS' can be manually linked to the second operating data BD', and four third visualization aspects VA" in the third set of visualization aspects VAS" can be manually linked to the third operating data BD". This manual linking respectively generates a planning/configuration program, to be precise a first planning/configuration program PKP when linking the five first visualization aspects VA to the first operating data BD, a second planning/configuration program PKP' when linking the three second visualization aspects VA' to the second operating data BD', and a third planning/configuration program PKP" when linking the four third visualization aspects VA" to the third operating data BD".

In this case, the visualization aspect, including the data binding, that is to say the bindings to the operating data BD, BD', BD", comprises, for example, the graphical representation of the desired or required image information, graphs, the visualization/presentation logic, the link to the data source as the device GE, GE', GE" having the device-specific operating data BD, BD', BD", etc.

The central engineering workflow for planning/configuring the screen visualization content on the data visualization system DVS or the HMI terminal via the central control device ZSTG for planning/configuring the screen visualization content shall be explained, by way of example, below on the basis of the first operating data BD, which are stored in the first controller CTR of the first device GE of the installation AL, AAL and are managed in the central device control system ZGKS as a central collection point, of the device operating data GBD provided and managed overall by the devices GE, GE', GE" in the installation AL, AAL.

Alternatively, the workflow—without any restriction—could also be outlined on the basis of the second or third devices GE', GE" having the device-specific operating data BD', BD".

The central engineering workflow begins with the data visualization system DVS and the central control device ZSTG being connected to the central device control system ZGKS via a further communication connection KV" in each case, wherein this communication connection is respectively characterized by a logical connection LOV" and a physical connection PHV". The communication connection between the central control device ZSTG and the central device control system ZGKS makes it possible, with respect to the exemplary planning/configuration of the screen visualization content on the basis of the first operating data BD for the first device GE, to manually link these device-specific operating data BD, now as already described above, to the first visualization aspects VA in the first set of visualization aspects to form the first planning/configuration program PKP.

In a next step of the central engineering workflow, the first planning/configuration program PKP which was generated in this manner in the central control device ZSTG and has the visualization aspects VA and the bindings to the first operating data BD (the data bindings) is transmitted, via the logical connection LOV" of the further communication connection KV", to the central device control system ZGKS and is transmitted from there to the first device GE and to the data visualization system DVS for respective storage there.

In the data visualization system DVS, the first planning/configuration program PKP having the visualization aspects VA and the data bindings is stored, via the processor PZ, in the memory SP as part of the program module PGM, where the first planning/configuration program PKP is executed immediately or with a time delay. During this program execution (also referred to as deployment), now with the control sovereignty of the processor PZ, the first operating data BD are loaded from the central device control system ZGKS into the data visualization system DVS via the physical connection PHV". Likewise with the control sovereignty of the processor PZ, these first operating data BD are then at least partially visualized as the screen content BSI on the screen BS with respect to at least one and in the context of at least one dedicated visualization aspect of the first visualization aspects VA provided with the first planning/configuration program PKP.

SUMMARY

An aspect relates to a method for visualizing screen content on a data visualization system and a data visualization system for visualizing screen content, with which the functionality can be monitored and controlled effectively in future in the case of a drastically increasing frequency of the changes and a greatly increasing number of networked devices in technical installations, in particular automation installations in the production process, over the course of the "Internet of Things" (IOT).

The idea on which the embodiment of the present invention is based involves, in the context of monitoring and controlling the functionality of at least one device, which is networked in an installation-related and operational manner to form a device network, in a technical installation, visualizing screen content on a data visualization system, in particular automatically and dynamically, for example during online operation of the devices or the installation, during which each visualization aspect from a set of visualization aspects available for the device can be linked to device-specific operating data, respectively tied to this visualization aspect, of device operating data provided by the installation. This is carried out by virtue of the fact that, after the system has been incorporated in the device network, a planning/configuration program which is provided in the device and has a multiplicity of monitoring/control objects, wherein the monitoring/control objects are determined and specified by linking the set of visualization aspects to the visualization aspects and visualization-aspect-based data bindings to the device-specific operating data of the device operating data, is loaded into the data visualization system by executing a plug-and-play protocol in accordance with a preplanning/preconfiguration program between the data visualization system and the device and with dedicated control of the device in the device network, and this planning/configuration program is executed by (i) selecting, with respect to a visualization aspect selected from the set of visualization aspects having the visualization aspects, a corresponding monitoring/control object from the monitoring/control objects, (ii) loading operating data of the device-specific operating data which correspond to this selection according to the visualization-aspect-based data binding of the selected monitoring/control object, and (iii) visualizing the selected operating data with respect to the selected visualization aspect as the screen content.

According to the one embodiment of the present invention, it is expedient if the data visualization system is an HMI terminal or an HMI application. The HMI application is an "APP" (APPLICATION) which is implemented and runs, for example, on a conventional personal computer in the form of a notebook, a tablet, a smartphone, etc.

A further advantageous embodiment of the present invention involves the set of visualization aspects having the visualization aspects and the planning/configuration program having the monitoring/control objects being provided when producing the device.

With respect to a further aspect of the present invention, it is expedient if the operating data and the device operating data extend to sensor data, actuator data and/or installation generation data of the technical installation.

The embodiment of the present invention can also be advantageously further developed, in the sense of simple handling and operation, by virtue of the fact that the selected visualization aspect from the set of visualization aspects and the corresponding selected monitoring/control object are selected with the aid of a selection menu on a screen of the data visualization system.

The solution according to the embodiment of the present invention dispenses with the known central control device, which is contained in the illustration of FIG. 1 and is in the form of a central engineering tool, for example in the form of a TIA portal, for the central engineering, for planning/configuring screen visualization content and allows optimized visualizations or presentations of the device operating data, which are based on domain know-how, to be made available to device or installation manufacturers with the aid of the monitoring/control objects containing the visualization aspects including the data bindings to the operating data. These can be loaded into the data visualization system in a device/installation setup without any additional central engineering effort—with respect to the choice of the visualization or presentation form, the link to the device controlled in a dedicated manner and its operating data, that is to say the data source of the choice, etc.—in a decentralized, automatic and dynamic manner and, for example, at the runtime of the device or the installation, that is to say online. Therefore, in contrast to the prior art represented in FIG. 1, in which it happens manually and off-line, the engineering takes place automatically and online without central engineering.

The visualization aspect including the data binding, that is to say the bindings to device operating data, comprises the graphical representation of the desired or required image information, graphs, the visualization/presentation logic, the link to the data source, etc.

The decentralized engineering workflow for planning/configuring the screen content is indicated by the sequence of characterizing features. In this manner, the problem on which the embodiment of the present invention is based can be effectively transformed, the planning/configuration software used, in particular the planning/configuration program, can be used continuously in the case of frequently occurring changes and any desired number of devices can be supported.

The solution according to the embodiment of the present invention is distinguished, in particular, by the fact that any desired number is supported, screen content can be distributed at the runtime without a restart, there is no need for any engineering effort with respect to the visualization/presentation and the linking of the data source at the user/end customer end, the domain know-how must be used only once at the manufacturer end and does not need to be used repeatedly at the customer end.

All of this is addressed by providing the screen content in a decentralized manner, that is to say the screen content (configuration, definition and planning) is provided in a distributed manner at the runtime.

The concept according to the embodiment of the present invention is prepared, in particular in the industrial environment, for future technologies which are characterized by the "Industrial Internet of Things (IIoT)". This concept also makes it possible to offer the end customer, that is to say the device or installation user, a modular and flexibly expandable data visualization system in this manner. This results in more flexibility with respect to changes for the end customer from the point of view of the device/installation manufacturer.

In addition, the technical connection is decoupled from the logical connection using topic-based provision of data and services.

As an alternative to providing the visualization aspects including the data bindings, that is to say providing the monitoring/control objects, it is also conceivable to offer the whole package via an Internet platform, for example via the Siemens-specific "Mindsphere" platform in the industrial environment, rather than via the individual devices. In this case, devices would register their data source with "Mindsphere" and would link it to presentation descriptions provided by the manufacturer.

BRIEF DESCRIPTION

Figure 2:
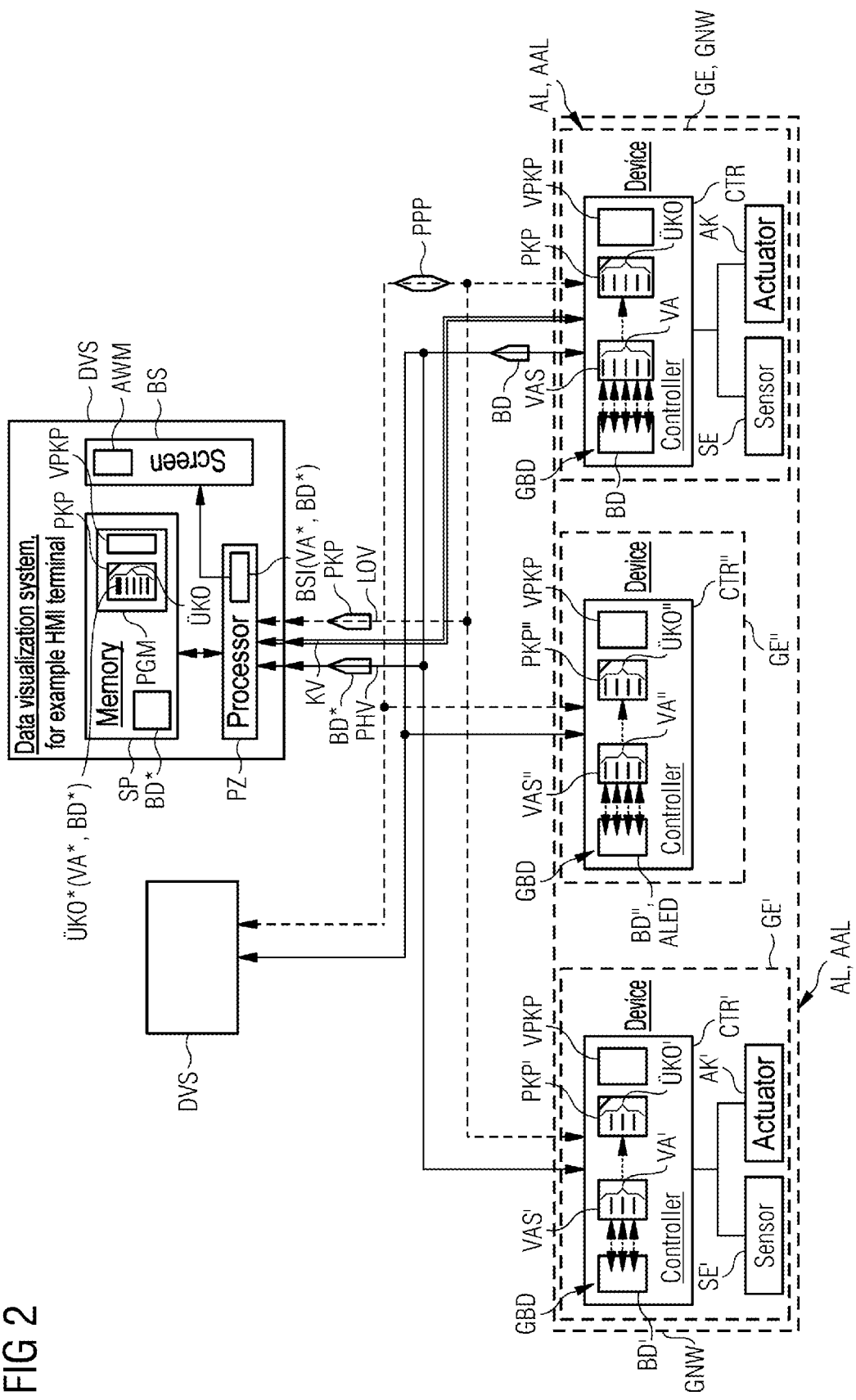

Further advantages of the embodiment of the present invention emerge, on the basis of FIG. 1, from the following description of an exemplary embodiment of the invention on the basis of FIG. 2. Some of the embodiments will be described in detail, with reference to the following figures, wherein like designations denote like members, wherein:

FIG. 1 depicts a central engineering for visualizing screen content on a data visualization system DVS, as is carried out in a known manner; and FIG. 2 depicts an exemplary embodiment of the present invention.

DETAILED DESCRIPTION

On the basis of FIG. 1, FIG. 2 shows decentralized engineering for visualizing screen content on a data visualization system DVS, as is carried out in a known manner, in which the data visualization system DVS may be in the form of either an HMI terminal or an HMI application in the form of an "APP" (APPLICATION) which is implemented and runs, for example, on a conventional personal computer in the form of a notebook, a tablet, a smartphone, etc. The decentralized engineering may certainly again also comprise a plurality of data visualization systems DVS. Like in FIG. 1, there are again two data visualization systems DVS according to FIG. 2 on which screen content can be visualized. The screen content visualization, like in FIG. 1, is explained, by way of example, on the basis of one data visualization system DVS of the two data visualization systems DVS illustrated.

Said data visualization system DVS again has a nonvolatile readable memory SP which stores processor-readable control program instructions of a program module PGM carrying out the screen content visualization, a processor PZ which is connected to the memory SP and executes the control program instructions of the program module PGM for visualizing the screen content, and a screen BS.

In order to visualize screen content BSI, the processor PZ accesses, on the one hand, the memory SP containing the program module PGM in order to generate the screen content BSI and, on the other hand, controls the screen BS, with the result that the generated screen content BSI can be visualized there. The manner in which the screen content BSI is generated in the processor PZ with the execution of the control program instructions of the program module PGM for visualizing the screen content is explained further below in connection with the description of FIG. 2.

In contrast to the data visualization system DVS in FIG. 1, a preplanning/preconfiguration program VPKP is stored as part of the program module PGM in the memory SP in the data visualization system DVS illustrated in FIG. 2 and a selection menu AWM can be presented on the screen BS. As far as the preplanning/preconfiguration program VPKP and the selection menu AWM are concerned, this is explained further below in the description of FIG. 2.

The screen content to be planned/configured in the decentralized engineering for the screen content visualization again comprises, like in the central engineering illustrated in FIG. 1, very generally data from devices in a technical installation AL which are networked in an installation-related and operational manner to form a device network GNW. Any type of technical installation can again be fundamentally used as the technical installation AL having the devices and any device can be used as the data source. In the case illustrated, the installation AL is an automation installation AAL in the production process. With respect to the devices in the device network GNW, the installation AL, AAL may comprise either a first device GE or a plurality of, for example three, devices, a first device GE, a second device GE' and a third device GE", which together with possibly further devices in addition to the three devices GE, GE', GE" illustrated, all provide device operating data GBD as data sources and are connected to one another in the device network GNW.

Of the devices GE, GE', GE" which are illustrated in FIG. 2, like in FIG. 1, and form the device network(s) GNW, the first device GE has a first controller CTR which is connected to a first sensor SE and to a first actuator AK, wherein both the first sensor SE and the first actuator AK provide data which are stored in the first controller CTR as operating data BD for the first device GE, that is to say as device-specific operating data BD, of the device operating data GBD.

The second device GE' has a second controller CTR' which is connected to a second sensor SE' and to a second actuator AK', wherein both the second sensor SE' and the second actuator AK' here again also provide data which are stored in the second controller CTR' as further operating data BD' for the second device GE', that is to say as further device-specific operating data BD', of the device operating data GBD.

The situation with the third device GE" is also slightly different here. Although the third device GE" also again has a controller, specifically a third controller CTR", this controller, in contrast to the controllers CTR, CTR' of the other two devices GE, GE', is not connected to a sensor and actuator providing data. Nevertheless, the third device GE", as a data source, also provides device-specific operating data of the device operating data GBD. Additional operating data BD" for the third device GE", which are in the form of installation generation data ALED for the technical installation AL, AAL, are thus stored in the third controller CTR". The installation generation data ALED are data which are generated by virtue of the third device GE" receiving device operating data GBD from the other two devices GE, GE' in the device network GNW and the installation generation data ALED being generated from these transmitted device operating data GBD, for example by means of calculation.

The controllers CTR, CTR', CTR" are again not least in the case of the automation installation AAL, in the form of programmable logic controllers (PLC).

In contrast to the controllers CTR, CTR', CTR" in FIG. 1, the controllers CTR, CTR', CTR" illustrated in FIG. 2 each have, like the data visualization system DVS illustrated in FIG. 2, the preplanning/preconfiguration program VPKP which is respectively stored in the controllers CTR, CTR', CTR". The meaning assigned to this preplanning/preconfiguration program VPKP respectively stored in the controllers CTR, CTR', CTR" in the context of the decentralized engineering when planning/configuring the screen content for the screen content visualization is explained further below in the description of FIG. 2.

For the decentralized planning/configuration of the screen visualization content, a set of visualization aspects—a first set of visualization aspects VAS having, for example, five (as illustrated by a check list in FIG. 2) visualization aspects in the first device GE, a second set of visualization aspects VAS' having, for example, three (as illustrated by a check list in FIG. 2) visualization aspects in the second device GE' and a third set of visualization aspects VAS" having, for example, four (as illustrated by a check list in FIG. 2) visualization aspects in the third device GE"—is provided in each device GE, GE', GE" in the device network GNW, when producing the device, and is accordingly stored in the respective controller CTR, CTR', CTR".

Each visualization aspect can likewise be linked to device-specific operating data BD, BD', BD", respectively tied to this visualization aspect, of the device operating data GBD, when producing the device. When producing the device for example, five first visualization aspects VA in the first set of visualization aspects VAS can thus be linked to the first operating data BD, three second visualization aspects VA' in the second set of visualization aspects VAS' can be linked to the second operating data BD' and four third visualization aspects VA" in the third set of visualization aspects VAS" can be linked to the third operating data BD", for example in a manner controlled by a production program (by means of a linking program used when producing the device).

This linking respectively generates a planning/configuration program with a respective multiplicity of monitoring/control objects which is accordingly stored in the respective controller CTR, CTR', CTR", to be precise a first planning/configuration program PKP having five first monitoring/control objects ÜKO which determine and state the link of the five first visualization aspects VA to the first operating data BD, a second planning/configuration program PKP' having three second monitoring/control objects ÜKO' which determine and state the link of the three second visualization aspects VA' to the second operating data BD', and a third planning/configuration program PKP" having four third monitoring/control objects ÜKO" which determine and state the link of the four third visualization aspects VA" to the third operating data BD".

In this case, the visualization aspect including the data binding, that is to say the bindings to the operating data BD, BD', BD", again comprises, for example, the graphical representation of the desired or required image information, graphs, the visualization/presentation logic, the link to the data source as the device GE, GE', GE" having the device-specific operating data BD, BD', BD", etc.

The decentralized engineering workflow for planning/configuring the screen visualization content on the data visualization system DVS or the HMI terminal or the HMI application shall be explained, by way of example, below on the basis of the first operating data BD, which are stored in the first controller CTR of the first device GE of the installation AL, AAL, the first set of visualization aspects VAS which is stored there and has the five first visualization aspects VA linked to the first operating data BD and the first planning/configuration program PKP having the first multiplicity of monitoring/control objects ÜKO which determine and state the link of the five first visualization aspects VA to the first operating data BD.

Alternatively, the workflow—without any restriction—could also be outlined on the basis of the second or third of the devices GE', GE", as devices considered to be dedicated, having the device-specific operating data BD', BD".

The decentralized engineering workflow begins with the data visualization system DVS being incorporated in the device network GNW of the installation AL, AAL by virtue of the data visualization system DVS being connected to the first device GE via a communication connection KV, wherein this communication connection is respectively characterized by a logical connection LOV and a physical connection PHV. It goes without saying that the data visualization system DVS or the further data visualization system DVS illustrated in FIG. 2 can also be accordingly connected to the other devices GE', GE" or to the first device GE. A corresponding consideration of the graphical illustration in FIG. 2 has been dispensed with owing to the exemplary explanation of the decentralized engineering workflow for planning/configuring the screen visualization content on the basis of the first device GE.

In a next step of the decentralized engineering workflow, when incorporating the data visualization system DVS in the device network GNW and executing the control program instructions of the program module PGM by means of the processor PZ on the basis of the preplanning/preconfiguration program VPKP contained in the program module PGM of the memory SP in the data visualization system DVS and in the first device GE, a plug-and-play protocol is executed and processed between the processor PZ and the first device GE via the logical connection LOV in order to connect the data visualization system DVS to the first device GE in terms of communication and control.

In a subsequent step of the decentralized engineering workflow, as the control program instructions of the program module PGM are executed further by the processor PZ during this communication and control connection and during the dedicated control of the first device GE in the device network GNW, likewise via the logical connection LOV, the planning/configuration program PKP which is generated in the first device GE, for example when producing the device, and is stored there and has the five first monitoring/control objects ÜKO which determine and state the link of the five first visualization aspects VA in the first set of visualization aspects VAS to the first operating data BD is loaded into the memory SP of the data visualization system DVS for the purpose of planning/configuring the screen content BSI to be visualized. This loading of the planning/configuration program PKP having the five first monitoring/control objects ÜKO is carried out in such a manner that the planning/configuration program PKP becomes part of the program module PGM with the loading.

In a final step of the decentralized engineering workflow, the processor PZ executes the planning/configuration program PKP loaded into the memory SP in such a manner that
   a) with respect to a visualization aspect VA* selected from the first set of visualization aspects VAS having the first visualization aspects VA, a corresponding monitoring/ control object ÜKO* is selected from the first monitoring/control objects ÜKO, b) according to the visualization-aspect-based data binding of the selected monitoring/control object ÜKO*, operating data BD* of the device-specific operating data BD, BD', BD", which correspond to this selection, are loaded from the first device GE into the data visualization system DVS, for example into the processor PZ or into the memory SP, as illustrated in FIG. 2, and c) the operating data BD* corresponding to the selected monitoring/control object ÜKO*, that is to say the selected operating data BD*, are visualized with respect to the selected visualization aspect VA* as the screen content BSI.

The visualization aspect VA* from the first set of visualization aspects VAS and the corresponding selected monitoring/control object ÜKO* can be selected with the aid of the selection menu AWM.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for visualizing screen content on a data visualization system, comprising:

a) in the context of monitoring and controlling the functionality of at least one device, which is networked in an installation-related and operational manner to form a device network, in a technical installation for planning/configuring screen content;

a1) capturing device operating data for monitoring and controlling the functionality and providing the captured device operating data for the data visualization system;

a2) linking respective visualization aspects from a set of visualization aspects which is available for the device, to device-specific operating data of the device operating data, which device-specific operating data are respectively tied to this visualization aspect;

b) executing a plug-and-play protocol between the data visualization system and the device, when incorporating the data visualization system in the device network on the basis of a preplanning/preconfiguration program contained in the data visualization system and in the device, wherein the plug-and-play protocol is used to connect the data visualization system in terms of communication and control to the device without requiring a separate registration, c) loading a planning/configuration program which is provided in the device and has a multiplicity of monitoring/control objects into the data visualization system for the purpose of planning/configuring the screen content to be visualized, during this communication and control connection in the case of dedicated control of the device in the device network, wherein the monitoring/control objects are determined and stated by linking the set of visualization aspects to the visualization aspects and visualization-aspect-based data bindings of the device-specific operating data;

d) wherein the planning/configuration program loaded into the data visualization system is executed by:

d1) selecting, with respect to a visualization aspect selected from the set of visualization aspects having the visualization aspects, a corresponding monitoring/control object from the monitoring/control objects;

d2) loading, according to the visualization-aspect-based data binding of the selected monitoring/control object, operating data of the device-specific operating data, which correspond to this selection, into the data visualization system; and d3) visualizing the selected operating data with respect to the selected visualization aspect as the screen content.

2. The method as claimed in claim 1, wherein an HMI terminal or an HMI application is used as the data visualization system.

3. The method as claimed in claim 1, wherein the set of visualization aspects having the visualization aspects and the planning/configuration program having the monitoring/control objects are provided when producing the device.

4. The method as claimed in claim 1, wherein the operating data and the device operating data are at least one of sensor data, actuator data and installation generation data of the technical installation.

5. The method as claimed in claim 1, wherein the selected visualization aspect from the set of visualization aspects and the corresponding selected monitoring/control object are selected with the aid of a selection menu on a screen of the data visualization system.

6. A data visualization system for visualizing screen content, having a non-volatile readable memory which stores processor-readable control program instructions of a program module carrying out the screen content visualization, and a processor which is connected to the memory and executes the control program instructions of the program module for visualizing the screen content, wherein:

a) in the context of monitoring and controlling the functionality of at least one device, which is networked in an installation-related and operational manner to form a device network, in a technical installation for planning/configuring screen content;

a1) device operating data for monitoring and controlling the functionality are captured and are provided for the data visualization system;

a2) from a set of visualization aspects which is available for the device, each visualization aspect can be linked to device-specific operating data of the device operating data, which device-specific operating data are respectively tied to this visualization aspect, wherein the processor and the program module are designed in such a manner and the processor executes the control program instructions of the program module in such a manner that;

b) when incorporating the data visualization system in the device network on the basis of a preplanning/preconfiguration program contained in the program module of the memory in the data visualization system and in the device, a plug-and-play protocol is executed between the processor and the device, which is used to connect the data visualization system in terms of communication and control to the device without requiring a separate registration;

c) during this communication and control connection in the case of dedicated control of the device in the device network, a planning/configuration program which is provided in the device and has a multiplicity of monitoring/control objects, wherein the monitoring/control objects are determined and stated by linking the set of visualization aspects to the visualization aspects and visualization-aspect-based data bindings to the device-specific operating data, is loaded into the memory via the processor for the purpose of planning/configuring the screen content to be visualized;
d) the planning/configuration program loaded into the memory is executed by;
d1) selecting, with respect to a visualization aspect selected from the set of visualization aspects having the visualization aspects, a corresponding monitoring/control object from the monitoring/control objects;
d2) loading, according to the visualization-aspect-based data binding of the selected monitoring/control object, operating data of the device-specific operating data, which correspond to this selection, into the data visualization system; and
d3) visualizing the selected operating data with respect to the selected visualization aspect as the screen content.

7. The data visualization system as claimed in claim 6, wherein an HMI terminal or an HMI application.

8. The data visualization system as claimed in claim 6, wherein the set of visualization aspects and the planning/configuration program having the monitoring/control objects are provided when producing the device.

9. The data visualization system as claimed in claim 6, wherein the operating data and the device operating data are at least one of sensor data, actuator data and installation generation data of the technical installation.

10. The data visualization system as claimed in claim 6, wherein a screen on which the selected visualization aspect from the set of visualization aspects and the corresponding selected monitoring/control object can be selected with the aid of a selection menu.

* * * * *